United States Patent Office 3,340,972
Patented Sept. 12, 1967

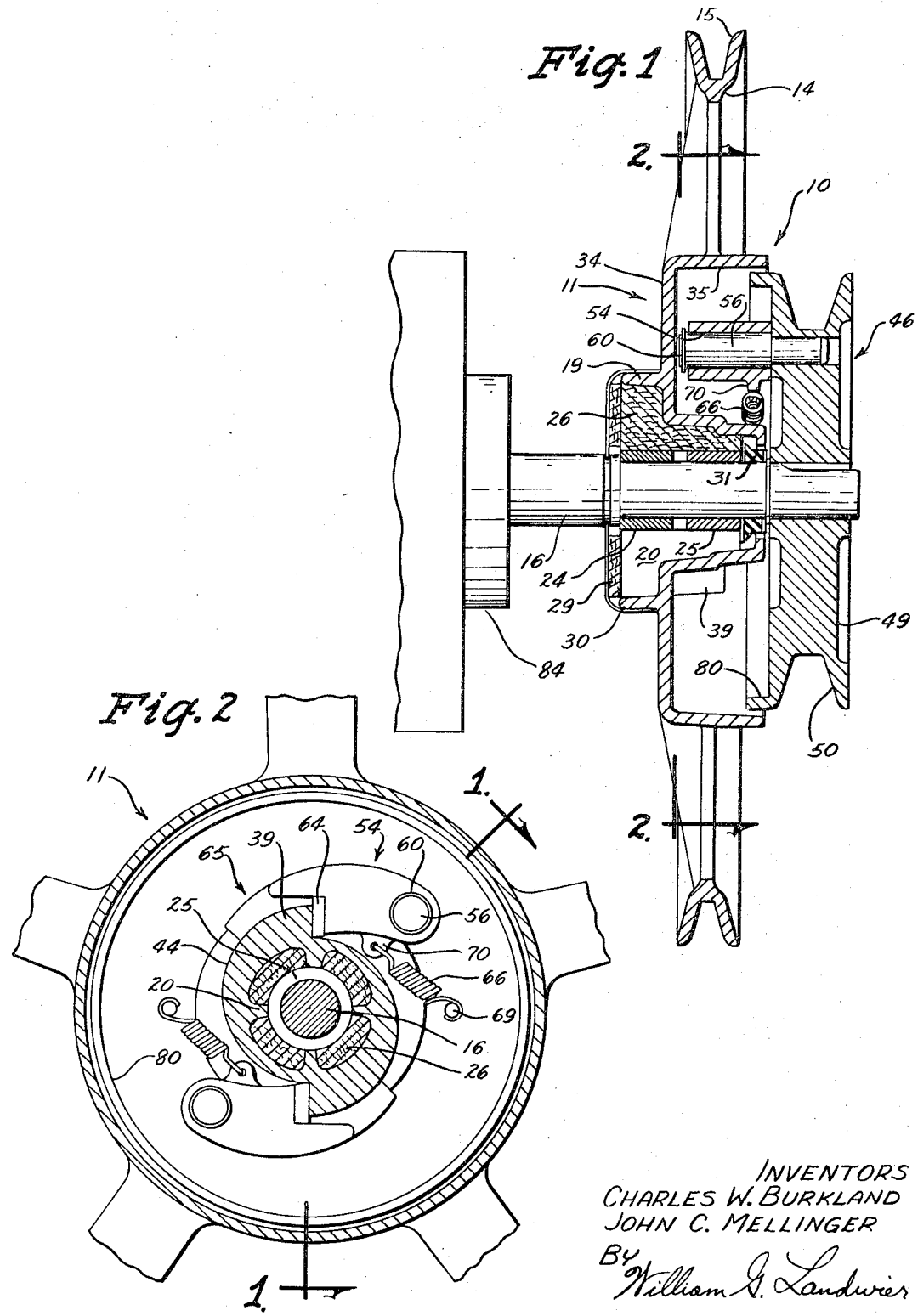

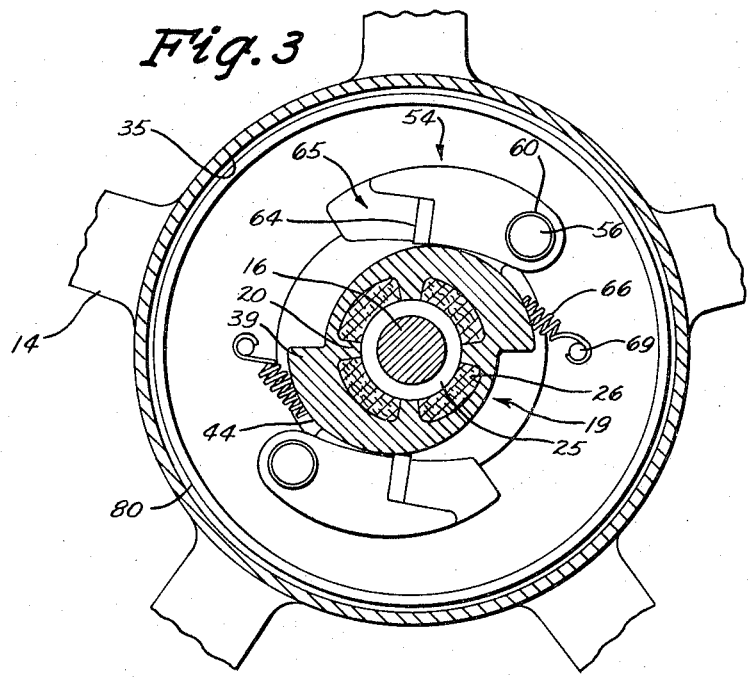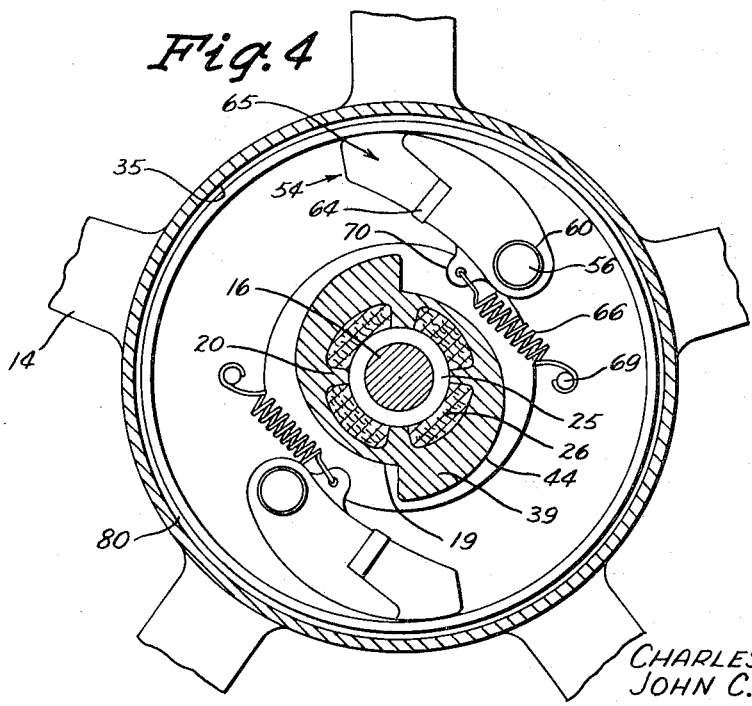

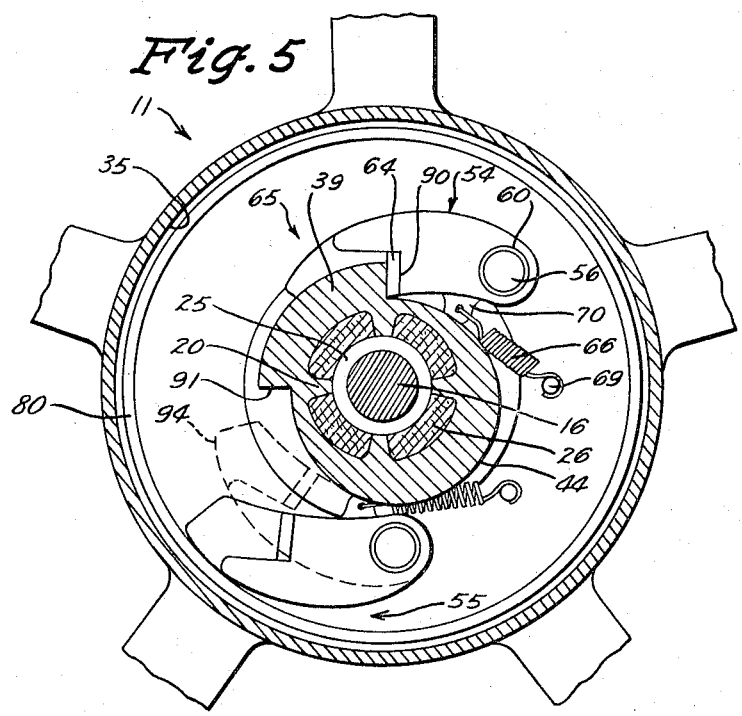
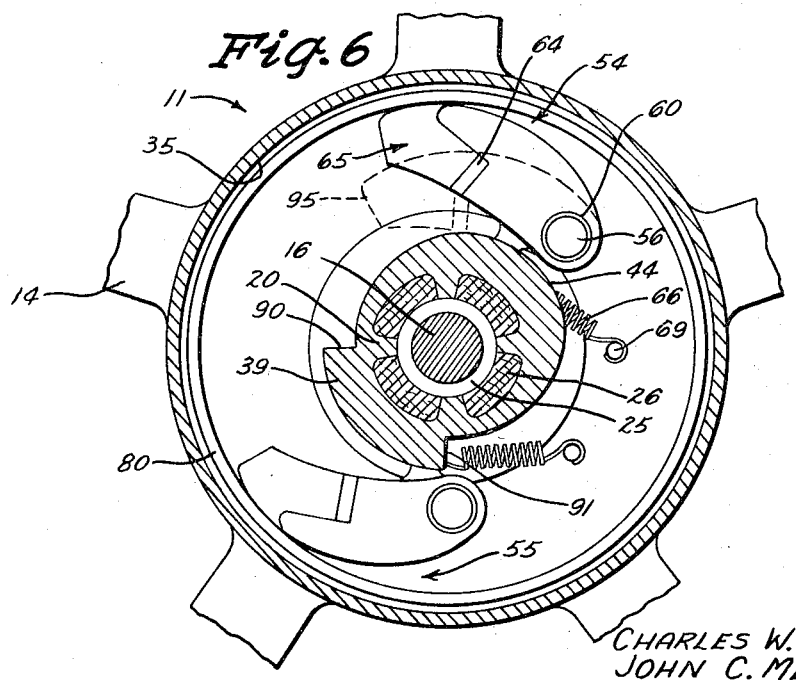

3,340,972
ONE-WAY ENGAGING REVERSIBLE PIVOTED
PAWL OVERRUNNING CLUTCH
Charles W. Burkland and John C. Mellinger, Newton, Iowa, assignors to The Maytag Company, Newton, Iowa, a corporation of Delaware
Continuation of application Ser. No. 417,102, Dec. 9, 1964. This application Oct. 24, 1966, Ser. No. 589,130
6 Claims. (Cl. 192—43.1)

ABSTRACT OF THE DISCLOSURE

A one-way and/or reversible pawl clutch including at least one pawl having a mass centroid movable from a first position at which the pawl is operatively engaged to a second radially outward position as the pawl rides up a driven cam surface. At the second radially outward position, the centrifugal force acting at the mass centroid is sufficiently increased to overcome a biasing means tending to hold the pawl in engagement with the driven cam surface.

---

This application is a continuation of Ser. No. 417,102, filed Dec. 9, 1964, now abandoned.

This invention relates to clutch devices and particularly to overrunning clutches useful in drive systems operable for driving at a plurality of speeds.

Numerous overrunning clutches are shown in prior art drive systems; however, most of them have no provision for complete disengagement between the driving and driven members during the overrunning operation. The prior art devices which do include means for disengagement of the driving and driven members are constructed so as to be responsive only to predetermined increases in rotational speed. These prior art devices are therefore limited since disengagement and free overrunning is possible only after a substantial increase in centrifugal speed.

It is therefore an object of this invention to provide an improved clutch operable for free overrunning between the driving and driven clutch members.

It is a further object of this invention to provide an overrunning clutch which is responsive to relative motion between the driving and driven members for effecting disengagement.

It is a further object of this invention to provide an improved clutch device which is responsive to relative overrunning motion between the driving and driven member for effecting disengagement and free overrunning therebetween.

It is a further object of this invention to provide a bi-directional overrunning clutch which is responsive to overrunning operation of the driven member in either direction for effecting complete disengagement.

It is yet a further object of this invention to provide a low cost clutch operative for free overrunning between the driving and driven members responsive to only very small differences between driving and overrunning speeds.

And it is a further object of the present invention to provide an improved overrunning clutch which is of low cost, rugged construction yet quiet in operation.

The above objectives of the present invention are realized in a drive system which includes a clutch having a driving member driven by a power source and a driven member drivingly connected to a member to be rotated. The driven member is rotated by the driving member through a lug and pawl arrangement. The driving and driven members are integral with a pair of pulleys in the preferred embodiment. The driven member may also be driven by a second power source for effecting overrunning operation.

The above mentioned driving member is formed with lugs engageable by pawls pivotally mounted on the driven member. The driving member also includes cam surfaces disposed for pivoting the pawls radially outward responsive to relative overrunning motion of the driven member relative to the driving member at which position increased centrifugal force will effect additional pivotal movement for fully disengaging the pawls to effect free overrunning operation of the driven member.

Details of operation of the instant invention and further objects thereof will become evident as the description proceeds and from an examination of the accompanying drawings which illustrate a preferred embodiment of the invention and in which similar numerals refer to similar parts throughout the several views.

In the drawings:

FIGURE 1 is a cross sectional view of a preferred embodiment of the clutch device of the instant invention as taken generally along the line 1—1 of FIGURE 2;

FIGURE 2 is a view of the clutch device taken generally along line 2—2 of FIGURE 1 and showing the pawls in driving position;

FIGURE 3 is a view similar to that of FIGURE 2 and shows the pawls in a cammed-out position during the initial stage of overrunning operation;

FIGURE 4 is also a view similar to that of FIGURE 2 and shows the pawls in the free overrunning position;

FIGURE 5 is a view similar to that of FIGURE 2 and shows a second embodiment of the instant invention in the form of a bidirectional clutch; and FIGURE 6 shows the bidirectional clutch of FIGURE 5 in the free overrunning condition.

Referring now to FIGURES 1 and 2, there is shown an overrunning clutch device 10 responsive to two individually operable power inputs for driving one power output in one direction at two speeds.

The first power input includes a driving clutch member 11 having a pulley 14 integrally attached thereto. Pulley 14 includes a V-groove 15 for receiving a drive belt (not shown) which is driven by a power source such as a motor (not shown).

Driving clutch member 11 is rotatably mounted on shaft 16 by a hub housing 19. Hub housing 19 includes a plurality of radially extending longitudinal ribs 20 for supporting the bearing members 24 and 25. These bearings 24 and 25 are retained within the cylindrical housing formed by the plurality of ribs 20 and are internally sized to permit free rotation of driving member 11 on shaft 16. Lubrication means, such as oil impregnated felt inserts 26, are positioned between adjacent ribs 20. At one end of the hub housing 19 is an additional annular-shaped felt member 29 and a retaining cup member 30 for retaining lubricating oil within the hub housing 19. At the opposite end of hub housing 19 is an oil slinger 31 which will rotate with shaft 16 to retain the lubricating oil within hub housing 19.

Included in the driving member 11 is an annular clutch housing 34 formed with a portion of the hub housing 19 as the innermost wall and an outer wall 35 spaced radially therefrom. Positioned within the annular clutch housing 34 and extending radially outward from the hub housing 19 are a pair of driving elements such as lug 39. The power delivered to the clutching device of the instant invention through pulley 14 will be directly transmitted through driving lugs 39 to members engageable therewith. As shown in the drawings, the outer diameter of hub housing 19 is formed so as to connect the diametrically opposite driving lugs by a pair of cam surfaces such as cam 44, the operation and function of which will be more fully defined hereinafter.

The power output includes a driven clutch member 46 having a pulley 49 attached integrally thereto. Driven clutch member 46 is fixed to shaft 16 for rotation therewith. Pulley 49 is formed with a V-groove 50 for receiving a belt (not shown) which may be drivingly connected to the object or load to be driven. Driven member 46 is positioned on shaft 16 juxtaposed to driving member 11 so as to cooperate with driving member 11 for transmitting power through the clutch device 10 of the instant invention.

Extending from driven member 46 into clutch housing 34 are a plurality of pawls such as pawls 54. Though one such pawl would be technically sufficient in a single direction clutch of the instant invention, the preferred embodiment as shown in FIGURES 1 through 4 includes two which are diametrically opposite so that additional counterbalancing is not necessary. These pawls 54 are identical in construction and operation and thus it is only necessary to describe one of them. Pawl 54 is supported upon pivot pin 56 which is in turn fixed to driven member 46. Pawl 54 is rotatably retained on pin 56 by retaining ring 60.

The pawl 54, for example, includes a cushion member 64 which is fixed to pawl 54 and engageable with the lug 39. This cushion member may be fabricated of a tough resilient material, such as a polyurethane elastomer, and is effective in absorbing shock loading, for improving the quietness of operation of the instant clutch device, and for permitting the use of many as-cast surfaces on component parts to reduce overall manufacturing cost.

Pawl 54 also includes a portion, indicated generally by numeral 65, which is effective for providing a mass responsive to a predetermined centrifugal force for pivoting pawl 54 clockwise about pivot pin 56 as viewed in FIGURE 2. A spring 66 is connected between pin 69 and ear 70 of pawl 54. Pin 69 is fixed to driven member 46 and thus cooperates with spring 66 to bias pawl 54 in a counterclockwise direction about pivot pin 56 as viewed in FIGURE 2.

As described above, the lugs are attached to the driving member 11 and the pawls to the driven member 46, but it is within the scope of this invention to reverse this arrangement and thereby place the pawl on the driving member.

Driven member 46 is also formed with a flange 80 extending into clutch housing 34 and having a function which will be more fully defined hereinafter.

Thus, a first power transmission path may be completed through the clutch device 10 from input pulley 14, through at least one of the lugs 39 of driving member 11, through at least one of the pawls 54 of driven member 46, and to output pulley 49. There is a condition of positive drive established between the lugs 39 and pawls 54 for rotating the driven member 46 at the same speed at which driving member 11 is rotated through pulley 14. Since driven member 46 is fixed to shaft 16 for rotation therewith, shaft 16 will also be rotated at the same speed as pulley 14. As will be more fully explained hereinafter, shaft 16 comprises an extension of the output shaft of a drive motor 84. In the above operation in which driving member 11 drives the driven member 46 at the speed of rotation of pulley 14, shaft 16 rotates the armature of de-energized motor 84 at the same speed.

As previously indicated, clutch device 10 of the instant invention is operable for providing two output speeds and includes two power inputs and one power output. The second power input is in the form of the above mentioned motor 84 for directly driving shaft 16. It is also within the scope of this invention, however, to drive shaft 16 by other pulley means or gear means which may in turn be driven by a remotely located motor or other power source. It is only necessary that means be provided for driving the driven member 46 without driving through driving member 11. In this preferred embodiment, a motor 84 is provided which includes a shaft member previously indicated as shaft 16. This motor 84 is operable for driving shaft 16, and thereby driving driven member 46, at a higher speed of rotation than that of driven member 11.

A comparison of FIGURES 2 and 3 shows that as the speed of rotation of driven member 46 exceeds that of driving member 11, the position of the pivot pin 56 of pawl 54, as representative of both pawls, will move in a clockwise direction relative to the driving lugs 39 and cams 44 of driving member 11. As best shown in FIGURE 3, this relative motion between the pawls 39 and the cams 44 will cause the pawls to be cammed, or pivoted, in a clockwise direction about their respective pivot pins and thereby moved radially outward, though not along a purely radial path.

It is an established law of physics that the amount of centrifugal force acting on a rotating body is dependent upon the radius of the centroid of that body from the rotating axis. The amount of centrifugal force, therefore, acting on the rotating pawls 54 and the mass portion 65 thereof is increasing as the pawls are cammed in a clockwise direction about pivot pin 56 to move the centroid of the pawl in a radially outward direction. The equation for centrifugal force acting on a rotating body is as follows: $F=Mrv^2$, where $F$=the centrifugal force acting on a rotating body; $M$=the rotating mass; $r$=the radius of rotation of the centroid of the rotating mass; and $v$=the angular velocity of the rotating mass expressed in radians per unit of time. Therefore, as the centroid of the pawl is pivotally moved outward in a generally radial direction, the radius of rotation increases and the amount of centrifugal force acting on the pawl increases.

As the relative motion between the driving member 11 and driven member 46 continues, the pawls will be moved to a position at which the centrifugal force acting on pawls 54 will be sufficient to overcome the biasing effect of springs 66 to permit the pivoting of pawls 54 to a fully disengaged position against a stop in the form of flange 80 of driven member 46.

Thus relative motion between driving member 11 and driven member 46 effects a camming-out of pawls 54 so that increased centrifugal force acting on the pawls will effect complete disengagement of pawls 54 to allow driven member 46 to freely overrun driving member 11. Only a small difference in speeds between driving member 11 and driven member 46 is effective for achieving this free overrunning operation. Motor 84 may, of course, be operable for further accelerating driven member 46 to higher speeds, but it should be especially noted that disengagement in the instant invention is responsive to, and dependent, upon, relative motion between driving and driven members rather than only upon the rotational speed of either of them.

It becomes clear that the instant invention is effective for achieving a slow acceleration from the first output speed toward higher speeds. Also this clutch is operative to effect reengagement of the clutch following a momentary disengagement of the driven member 46 responsive to variations in the loading of the member driven by pulley 49.

To establish re-engagement of pawls 54 with lugs 39 of driving member 11 following overrunning operation and complete disengagement of pawls 54, it is only necessary that motor 84 be de-energized and driven member 46 allowed to coast down to a speed at which the centrifugal force acting on pawls 54 will allow movement thereof toward the cammed-out position adjacent lugs 39. In coasting down further, driven member 46 will underrun driving member 11 before the biasing force of springs 66 causes pawls 54 to become drivingly re-engaged with the associated lugs. This deceleration and re-engagement sequence follows the equation $F=Mrv^2$ since the decrease in speed allows the centrifugal force to decrease to a point at which the biasing effect of springs 66 will overcome the centrifugal force and will pivot pawls 54 in a counterclockwise direction. If the mounting of the lugs and pawls is reversed so the pawls are mounted on the driving member 11 it would be necessary to decelerate pulley 14 to effect re-engagement of the clutch.

The driving pawls 54 may have a configuration as shown in the preferred embodiment but may also, of course, be designed in other shapes and sizes. The amount and location of mass included in the pawls and the rate of spring force for the biasing means, such as spring 66 attached thereto, may be varied and need only to be selected to provide the relative amounts of centrifugal and biasing force necessary to give the desired operation. It would be possible to select a centrifugal force and spring biasing force so that the pawl members will pivot about pin 56 upon reaching the cammed-out position responsive to a speed only slightly above that of the driven member 11. It would also be possible to decrease the mass portion of pawl 54 or alter the shape of cam 39, for example, to achieve a condition which would require that driven member 46 be rotating at speeds substantially above the speed of driving member 11 before a full disengagement of pawls 54 is effective.

A second embodiment of the instant invention is a bidirectional overrunning clutch as shown in FIGURES 5 and 6. This device is similar to the clutch shown in FIGURES 1 through 4 except for modifications to make the clutch operable in both directions. The driving and driven clutch members and the hub structure are identical to that previously shown and therefore have the same designations and numerals as previously discussed.

The clutch device as shown in FIGURES 1 through 4 has been modified by reversing one of the pawl members and revising the driving lugs so as to facilitate operation of the device in a counterclockwise direction as well as the previously disclosed clockwise direction.

The hub of driving member 11 includes a lug portion 39 and a cam portion 44, each of which functions as in the unidirectional embodiment. Lug 39 includes a driving face 90 engageable with pawl 54 for clockwise rotation and a driving face 91 engageable with pawl 55 for counterclockwise rotation. Cam 44 and lug 39 are spaced so that upon engagement of one of the pawl members with a driving face of lug 39, the other pawl is pivoted out of driving position by cam 44 as shown by the broken line position 94 of pawl 55 in FIGURE 5.

As previously disclosed, the increased centrifugal force acting upon the pawl 55 in the cammed-out position, will move it to the full line, fully disengaged, position shown in FIGURES 5 and 6. The bidirectional clutch thereby becomes fully operable in the clockwise direction, for example.

Upon overrunning operation of driven member 46 relative to driving member 11, driving face 90 will become drivingly disengaged from lug 54 and will allow cam 44 to pivot pawl 54 in a generally outward direction, as shown in FIGURE 6. At the cammed-out position, as indicated by the broken line position 95, centrifugal force acting on pawl 54 will effect movement of pawl 54 from the broken line position 95 to the full line position shown in FIGURE 6.

By way of summary, the operation of the unidirectional overrunning clutch of the instant invention will be reviewed. For operation of driven member 46 at a first output speed, driving member 11 is driven through pulley 14 by a first power source at a given first speed. The pawls 54 are engaged with the driving lugs 39 so as to transmit power from pulley 14 through the clutching device to pulley 49. The driven member 46 is coupled to the driving member 11 and is rotated at a given first speed corresponding to that of pulley 14.

To obtain a second higher speed of operation of driven member 46, motor 84 is energized for accelerating shaft 16. As shaft 16 is accelerated, driven member 46 is rotated at a speed greater than that of driving member 11 and thus is rotating relative to, or overrunning, driving member 11. This condition causes pawls 54 to move away from driving lugs 39 and be cammed or pivoted by cams 44 in a clockwise direction about pivot pins 56. Upon continued relative movement and the resulting pivoting of pawls 54 about pins 56, an increased centrifugal force at the increased radius of rotation causes the pawls to move further and become completely disengaged from the driving elements of driving member 11. It is noted that the pawls do not immediately become disengaged by centrifugal force but are cammed from the driving position to a second position from which they are pivoted to the outermost position under centrifugal force.

To facilitate re-engagement of the driving pawls 54 with driving lugs 39, it is only necessary that the second power source, such as motor 84 in this embodiment, be de-energized to allow driven member 46 to decrease in speed to a point at which the centrifugal force of the pawls is overcome by the biasing effect of springs 66. The speed of the driven member 46 must decrease to a speed lower than that of the driving member 11 to allow spring members 66 to return the pawls to the drivingly engaged position.

It may, therefore, be seen that the instant invention provides an improved overrunning clutch which is operable for effecting conditions of complete disengagement of the driving member at minimum differences between the driving speed and the overrunning speed. The feature of the instant invention in which a complete disengagement of a driving and driven members is possible at very small speed differentials is specially advantageous in uses requiring an overrunning speed which is only very slightly greater than the driving speed. The instant invention also provides a compact, efficient, and low cost but rugged overrunning clutch which is operable at very low noise levels.

In the drawings and specifications, there has been set forth a preferred embodiment of the invention and although specific terms are employed, these are used in a generic and descriptive sense only and not for purposes of limitation. Changes in form and the proportion of parts, as well as the substitution of the equivalents are contemplated, as circumstances may suggest or render expedient, without departing from the spirit or scope of this invention as further defined in the following claims.

We claim:

1. In an overrunning clutch device, the combination comprising: a driving clutch member rotatable about an axis; drive means for rotating said driving clutch member at a primary speed; a driven clutch member juxtaposed to said driving clutch member and positioned coaxially thereto; means associated with said driving and driven clutch members to effect driving engagement therebetween and including at least one movably mounted element; means for biasing said movably mounted element to a drivingly engaged position at which the biasing force tending to maintain the movably mounted element engaged exceeds the centrifugal force acting on said movably mounted element at said primary speed, said movably mounted element having a mass centroid located at a first radius of rotation about said axis when said movably mounted element is biased to said drivingly engaged position; and means for moving said movably mounted element outwardly from said axis to a first drivingly disengaged position for positioning said mass centroid at a second greater radius of rotation responsive to overrunning operation by said driven clutch member at which position the centrifugal force exceeds the biasing force acting on said movably mounted element at substantially said primary speed whereby said movably mounted element is moved to a second fully disengaged position at substantially said primary speed.

2. In an overrunning clutch device, the combination comprising: a driving clutch member rotatable about an axis; drive means for rotating said driving clutch member at a primary speed; a driven clutch member juxtaposed to said driving clutch member; means associated with said driving and driven clutch members to effect driving engagement therebetween and including at least one pawl means movably mounted on one side of said clutch members; means biasing said pawl means into a drivingly engaged position with the other of said clutch members at which the mass centroid of said pawl means is located at a first radius of rotation about said axis; and means for moving said pawl means to a first drivingly disengaged position and for moving said mass centroid to a second greater radius of rotation responsive to overrunning operation by said driven clutch member, said second radius of rotation being sufficiently greater than said first radius of rotation for effecting movement of said pawl means to a second fully disengaged position under increased centrifugal force acting upon said mass centroid and exceeding the opposing force of said biasing means at substantially said primary speed and at said second radius of rotation.

3. In an overrunning clutch device as defined in claim 2 wherein said pawl means is mounted for movement about a pivot point and includes an engaging portion and a mass portion and wherein said mass portion extends outwardly from said pivot point a distance greater than said engaging portion for positioning the mass centroid of said pawl means outwardly from said pivot point and increasing the differential between said first radius of rotation and said second radius of rotation.

4. In an overrunning clutch device as defined in claim 3 and further including second drive means for accelerating said driven clutch member above said primary speed to effect an overrunning of said driven clutch member relative to said driving clutch member.

5. In an overrunning clutch device, the combination comprising: a driving clutch member rotatable about an axis; drive means for rotating said driving clutch member at a primary speed in first and second directions; a driven clutch member juxtaposed to said driving clutch member and positioned coaxially thereto; means associated with said driving and driven clutch members including a pair of pawl means mounted on one of said clutch members for movement about a pivot point, each of said pair of pawl means having an engaging portion drivingly engageable with the other of said clutch members for effecting selective rotation of said driven clutch member in one of said first and second directions and further having a mass portion connected to said engaging portion; means for biasing said pawl means toward said other clutch member and effecting engagement of one of said pair of pawl means upon rotation of said driving clutch member in said first direction, said engaged pawl means having a mass centroid located at a first radius of rotation about said axis; first cam means responsive to rotation of said driving clutch member in said first direction for moving the other of said pair of pawl means about said pivot point in a disengaging direction toward a drivingly disengaged position and moving the mass centroid of said other pawl means to a second greater radius for rotation about said axis, said mass portion having a sufficient mass and said second radius of rotation being sufficiently greater than said first radius of rotation to produce increased centrifugal force at substantially said first speed for moving said other pawl means to a fully disengaged position; and second cam means for moving said one engaged pawl means to said drivingly disengaged position responsive to overrunning operation of said driven clutch member in said first direction relative to said driving clutch member, said one pawl means being responsive to increased centrifugal force with said mass centroid at said second greater radius of rotation for movement to a fully disengaged position.

6. In an overrunning clutch as defined in claim 5 and further including second drive means operable for driving said driven clutch member at a speed higher than said primary speed in either of said first and second directions.

No references cited.

CARLTON R. CROYLE, *Primary Examiner.*

A. T. McKEON, *Assistant Examiner.*

UNITED STATES PATENT OFFICE
CERTIFICATE OF CORRECTION

Patent No. 3,340,972                            September 12, 1967

Charles W. Burkland et al.

It is hereby certified that error appears in the above numbered patent requiring correction and that the said Letters Patent should read as corrected below.

Column 1, lines 48 and 49, for "member" read -- members --; column 7, line 5, strike out "side"; column 8, lines 6 and 7, for "furthere" read -- further --; line 19, for "for" read -- of --.

Signed and sealed this 1st day of October 1968

(SEAL)
Attest:

Edward M. Fletcher, Jr.                            EDWARD J. BRENNER

Attesting Officer                                           Commissioner of Patents